3,135,798
STABILIZED AMINES

Eugene L. Powers, New Martinsville, W. Va., assignor to Mobay Chemical Company, Pittsburgh, Pa., a corporation of Delaware
No Drawing. Filed July 16, 1962, Ser. No. 210,229
14 Claims. (Cl. 260—578)

This invention relates to the stabilization of aromatic amines and more particularly to the stabilization of tolylene diamines against deterioration and discoloration.

The tolylene diamines are used in great quantities as starting materials in the manufacture of diisocyanate as well as in many other chemical systems leading to the production of synthetic resins and plastics such as polyurethanes. These tolylene diamines are normally light yellow to colorless when first prepared, but are found to darken quite rapidly during storage when exposed to light and/or elevated temperatures and/or air. This darkening phenomenon obviously detracts from the desirability of these compounds, particularly with regard to some end uses.

Various means have been suggested to overcome the problem of darkening of aromatic amines, most of which suggestions involve the addition of organic or inorganic stabilizers to the amines.

Though some of the previously suggested stabilizers have been found to be fairly effective in inhibiting discoloration of some types of organic amines during storage, most of these suggested stabilizers have been found to be ineffective or of questionable value when used with tolylene diamines.

It is an object of this invention to provide compositions comprising essentially tolylene diamines or mixtures thereof having improved stability. A still further object of this invention is to provide a process for inhibiting discoloration of tolylene diamines or mixtures thereof.

In general, the present invention comprises adding to a composition consisting essentially of tolylene diamines or mixtures thereof, a stabilizer selected from the group consisting of stannous octoate and stannous oleate. The invention comprises the thus stabilized compositions.

The tolylene diamines include, 2,3-, 2,4-, 2,5-, 2,6-, 3,4-, 3,5-tolylene diamines and mixtures thereof.

As has been stated, the stabilized compositions may also comprise mixtures of two or more tolylene diamines. A particularly preferred composition is one comprising a mixture of 2,4-tolylene diamine and 2,6-tolylene diamine. More particularly, preferred compositions of this type are those comprising a mixture of about 80% 2,4-tolylene diamine and about 20% 2,6-tolylene diamine or about 65% 2,4-tolylene diamine and about 35% 2,6-tolylene diamine. Up to 5% of other isomers may be present in these preferred compositions.

It has been found that the above discussed tolylene diamine compositions are rendered substantially more stable against discoloration during storage by adding thereto a small amount of stannous octoate or stannous oleate. In general, either or both of these stannous compounds have been found to be excellent stabilizers when used in various amounts up to about 5% by weight based on the weight of the tolylene diamines. A concentration up to about 25% by weight may be used when Sn salt is the catalyst for reaction. It is preferred to use from about 0.1% to about 1% by weight of the stabilizers, and most preferably, at least 0.5% by weight. Best results are obtained if the stabilized amine is blanketed with an inert gas.

The invention is further illustrated by the following examples in which the parts are by weight unless otherwise specified.

Example 1

In this example a series of samples were tested wherein approximately 500 cc. of a freshly distilled mixture of approximately 80% 2,4-tolylene diamine and 20% 2,6-tolylene diamine were introduced into 1 liter flasks. Air was excluded above the tolylene diamine mixture by flushing and blanketing with nitrogen gas after which varying quantities of stannous octoate were mixed with the liquid in each flask. The flasks were thereafter sealed and some were stored at room temperature (about 25° C.) in the light while others were stored at 50° C. in the dark. The following table shows the results of these tests in terms of visual observation after varying periods of storage. It will be noted that substantially improved color stability is found when using as low as 0.1% stannous octoate as compared to the controls with no stabilizer, and that when using as little as 0.5% stannous octoate, discoloration is inhibited even after several weeks of storage.

| Stannous Octoate, Percent | Storage Conditions | Observations |
|---|---|---|
| 0.1 | Room temp., light | Flaked, started to turn brown after 3 days. |
| 0.3 | do | Top layer turned dark after 11 days. About ¾ still white. |
| 0.5 | do | Flaked, still white after 3 weeks. |
| Control | do | Flaked, dark brown after 1 day. |
| 0.1 | 50° C., dark | Top layer was brown after 11 days. About ¾ still white. |
| 0.3 | do | Top layer was brown after 11 days. About 4/5 still white. |
| 0.5 | do | Top layer was light brown after 3 weeks. About ¾ still white. |
| Control | do | Flaked, dark brown after 1 day. |

Example 2

The same procedure as described above in connection with Example 1, when carried out with a tolylene diamine mixture comprising 65% 2,4-tolylene diamine and 35% 2,6-tolylene diamine, produces substantially the same results.

Example 3

The same procedure as described in connection with Examples 1 and 2 when carried out with stannous oleate in place of stannous octoate is found to give substantially similar results with only slightly less effective color stabilization. For example, a mixture of 80% 2,4-tolylene diamine and 20% 2,6-tolylene diamine containing 0.3% stannous oleate when stored at room temperature (25° C.) in the light, starting to turn dark only after about two weeks. Similar results were obtained when using a mixture of 76% 2,4-tolylene diamine, 19% 2,6-tolylene diamine and 5% other isomers containing 0.3% stannous oleate.

When a flaked form of tolylene diamine is prepared for ease of handling etc., the stabilizer becomes more important to prevent discoloration. The above tests (as indicated in the examples) thus were also carried out using a flaked form of tolylene diamines together with a liquid form of tolylene diamines. The results obtained were similar in all cases.

There has been described above, means for stabilizing tolylene diamines and mixtures thereof against discoloration by incorporating therewith a small portion of an inhibitor selected from the group consisting of stannous octoate and stannous oleate. From the examples it is apparent that the stability of such compositions is far greater than is the case when no inhibitor is present, even though the control composition is stored under a blanket of nitrogen and in the dark.

Obviously, many modifications and variations of the present invention are possible in the light of the above teachings. It is, therefore, to be understood that within the scope of the appended claims, the invention may be practiced otherwise than as specifically described.

Although the invention has been described in considerable detail for the purpose of illustration, it is to be understood that variations can be made by those skilled in the art without departing from the spirit of the invention and scope of the claims.

What is claimed is:

1. A composition having improved stability against discoloration comprising tolylene diamine having added thereto from about 0.1% to about 5% of a stabilizer selected from the group consisting of stannous octoate, stannous oleate and mixtures thereof.

2. A composition according to claim 1 wherein said stabilizer is present in a quantity of at least 0.5% by weight.

3. A composition according to claim 1 wherein said stabilizer is stannous octoate.

4. A composition according to claim 1 wherein said stabilizer is stannous oleate.

5. A composition according to claim 1 wherein said composition comprises a mixture of about 80% 2,4-tolylene diamine and about 20% 2,6-tolylene diamine.

6. A composition according to claim 1 containing a mixture of about 65% 2,4-tolylene diamine and about 35% 2,6-tolylene diamine.

7. A composition having improved stability against discoloration comprising a mixture of 2,4-tolylene diamine with up to about 40% 2,6-tolylene diamine having added thereto 0.1 to 5.0% of a stabilizer selected from the group consisting of stannous oleate and stannous octoate.

8. A composition having improved stability against discoloration comprising a mixture of about 76% 2,4-tolylene diamine, 19% of 2,6-tolylene diamine and about 5% of other isomers having added thereto 0.1 to 5.0% of a stabilizer selected from the group consisting of stannous oleate and stannous octoate.

9. The method of inhibiting discoloration of tolylene diamines which comprises adding to said tolylene diamines 0.1 to 25.0% of a stabilizer selected from the group consisting of stannous octoate and stannous oleate.

10. The method of inhibiting discoloration of tolylene diamines which comprises adding to said tolylene diamines 0.1 to 5.0% of a stabilizer selected from the group consisting of stannous octoate and stannous oleate.

11. Method according to claim 9 wherein said tolylene diamines comprise a mixture of 2,4-tolylene diamine with up to about 40% 2,6-tolylene diamine.

12. Method according to claim 11 wherein at least 0.5% of said stabilizer is added.

13. Method according to claim 11 wherein said stabilizer is stannous oleate.

14. Method according to claim 11 wherein said stabilizer is stannous octoate.

References Cited in the file of this patent

UNITED STATES PATENTS 2,526,963     Morris ---------------- Oct. 24, 1950